United States Patent
Clemen et al.

(10) Patent No.: US 12,460,822 B2
(45) Date of Patent: Nov. 4, 2025

(54) COMBUSTION CHAMBER ASSEMBLY FOR OPERATION WITH LIQUID AND/OR GASEOUS FUEL, GAS TURBINE ASSEMBLY AND METHOD

(71) Applicant: Rolls-Royce Deutschland Ltd & Co KG, Blankenfelde-Mahlow (DE)

(72) Inventors: Carsten Clemen, Mittenwalde (DE); Thomas Dörr, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 9 days.

(21) Appl. No.: 18/358,647

(22) Filed: Jul. 25, 2023

(65) Prior Publication Data

US 2024/0053015 A1    Feb. 15, 2024

(30) Foreign Application Priority Data

Aug. 10, 2022 (DE) ..................... 10 2022 208 339.3

(51) Int. Cl.
 *F23R 3/36* (2006.01)
 *F23R 3/28* (2006.01)

(52) U.S. Cl.
 CPC ............... *F23R 3/36* (2013.01); *F23R 3/286* (2013.01); *F05D 2220/323* (2013.01); *F05D 2240/35* (2013.01)

(58) Field of Classification Search
 CPC ............. F23R 3/00; F23R 3/36; F23R 3/286
 See application file for complete search history.

(56) References Cited

U.S. PATENT DOCUMENTS 6,513,334 B2 * 2/2003 Varney ................ F23M 20/005
  60/725
9,200,808 B2  12/2015 Romig et al.
(Continued)

FOREIGN PATENT DOCUMENTS

DE   102011000225 A1   7/2011
EP       2808612 A1   12/2014

OTHER PUBLICATIONS

European Search Report dated Jan. 2, 2024 from counterpart European App No. EP 23190015.
(Continued)

*Primary Examiner* — Gerald L Sung
*Assistant Examiner* — Jacek Lisowski
(74) *Attorney, Agent, or Firm* — SHUTTLEWORTH & INGERSOLL, PLC; Timothy J. Klima

(57) ABSTRACT

The invention concerns a combustion chamber assembly, in particular for use in an aircraft engine, including:
 a peripheral wall which borders a combustion space oriented along a longitudinal axis, and
 at least one, preferably a plurality of fuel nozzle(s) arranged on the input side of the combustion space for the supply of liquid fuel to the combustion space.
An alternative and/or combined optimised operation with fuels of different aggregate states can be achieved with comparatively low structural complexity in that the combustion chamber assembly is configured for operation with liquid and/or gaseous fuel, wherein at least one, preferably a plurality of gas supply openings arranged downstream of the fuel nozzle(s) on the peripheral wall is/are present, by means of which gaseous fuel can be introduced into the combustion space.

18 Claims, 10 Drawing Sheets

(56) References Cited

U.S. PATENT DOCUMENTS

Figures 1A, 1B:
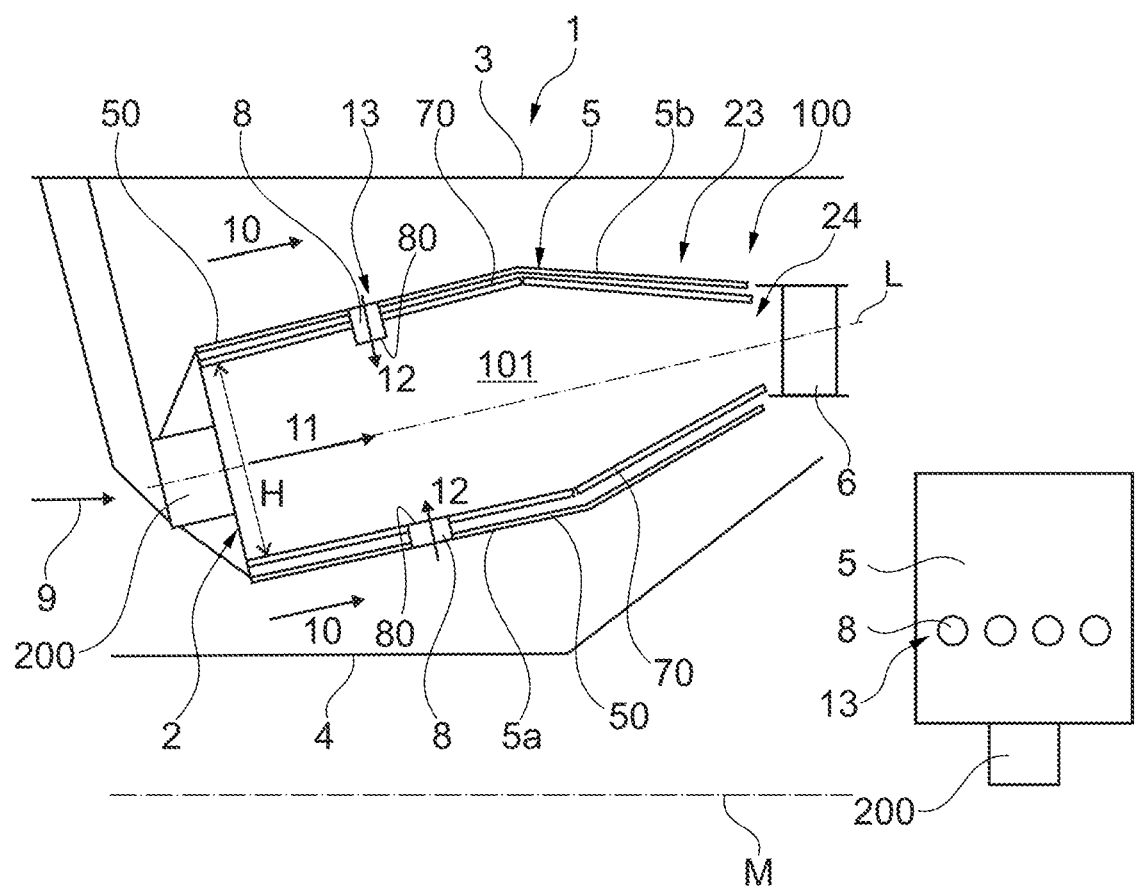

| | | |
|---|---|---|
| 2007/0089419 A1 | 4/2007 | Matsumoto et al. |
| 2007/0107437 A1 | 5/2007 | Evulet |
| 2013/0174558 A1 | 7/2013 | Stryapunin |
| 2014/0090391 A1* | 4/2014 | Burd .................. F23K 5/20 60/734 |
| 2014/0338359 A1* | 11/2014 | Valeev ................ F23R 3/36 60/776 |
| 2015/0219338 A1* | 8/2015 | Dai .................... F23R 3/50 60/746 |
| 2016/0123596 A1 | 5/2016 | Hoke |
| 2016/0201897 A1 | 7/2016 | Snyder et al. |
| 2017/0307210 A1 | 10/2017 | Hirano |
| 2019/0162413 A1* | 5/2019 | Amble ................ F02K 1/822 |
| 2021/0199298 A1 | 7/2021 | Berry |

OTHER PUBLICATIONS

German Search Report dated Apr. 12, 2023 from counterpart German Patent Application No. 10 2022 208 339.3.

* cited by examiner

State of the Art

State of the Art

State of the Art

State of the Art

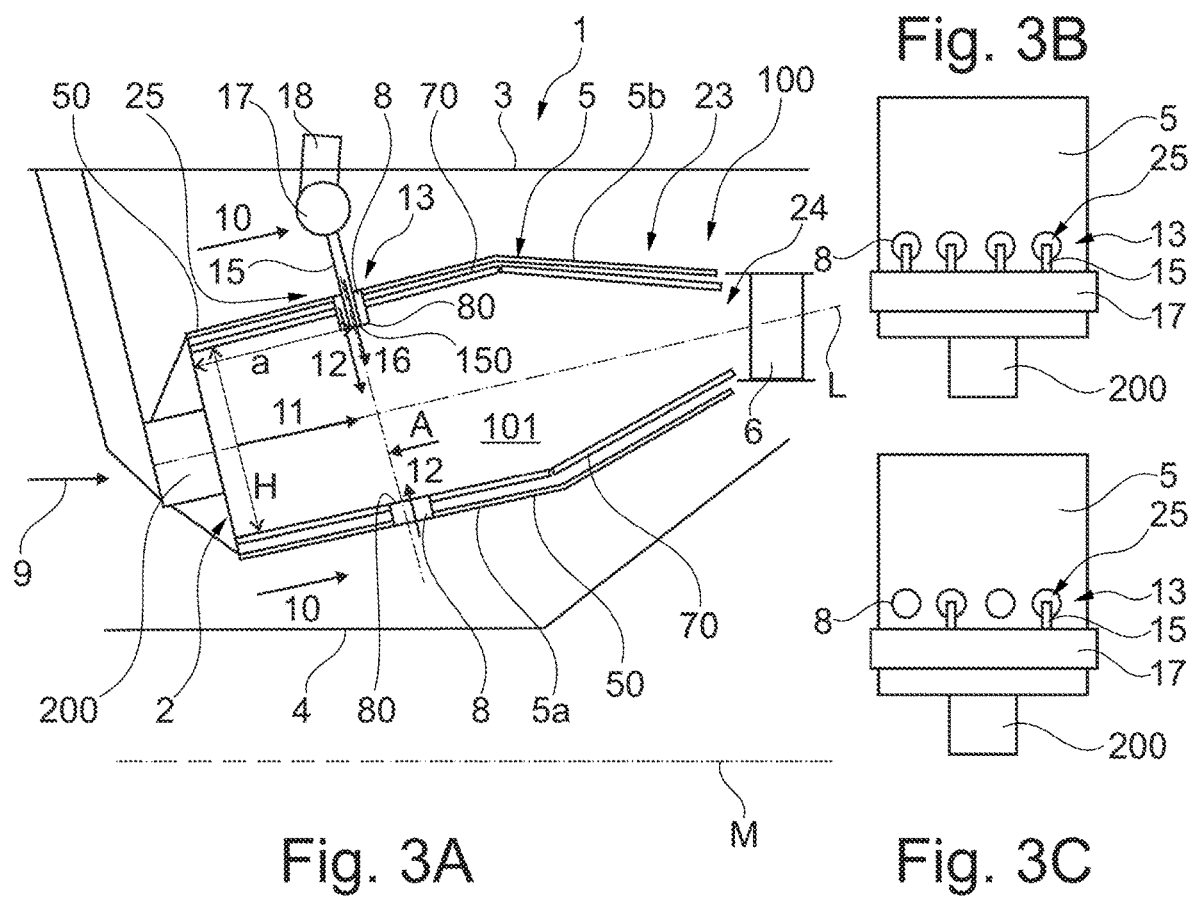

COMBUSTION CHAMBER ASSEMBLY FOR OPERATION WITH LIQUID AND/OR GASEOUS FUEL, GAS TURBINE ASSEMBLY AND METHOD

This application claims priority to German Patent Application 102022208339.3 filed Aug. 10, 2022, the entirety of which is incorporated by reference herein.

The invention concerns a combustion chamber assembly, in particular for use in an aircraft engine, according to the present disclosure. The invention furthermore concerns a gas turbine assembly and a method for operating the combustion chamber assembly.

In known so-called "dual fuel" combustion chamber assemblies for use in aircraft engines, fuels of different types—in particular liquid and/or gaseous fuels—can be introduced into the combustion space for combustion alternatively to one another or simultaneously.

A known combustion chamber assembly for operation with liquid and/or gaseous fuel is disclosed for example from U.S. Pat. No. 2,016,201 897 A1. Here, a nozzle device is provided by means of which liquid and/or gaseous fuel can be introduced into the combustion chamber.

The present invention is based on the object of providing a combustion chamber assembly, a gas turbine assembly and a method of the type cited initially, wherein an alternative and/or combined optimised operation with fuels of different aggregate states is possible with comparatively little structural complexity.

This object is achieved for the combustion chamber assembly , for the gas turbine assembly, and for the method with features as disclosed herein.

With respect to the combustion chamber assembly, it is provided that the combustion chamber assembly is configured for operation with liquid and/or gaseous fuel, wherein at least one, preferably a plurality of gas supply openings is/are present which are arranged downstream of the fuel nozzle(s) on the peripheral wall, and by means of which gaseous fuel can be introduced into the combustion space.

The gaseous fuel is preferably not supplied from the end face on the input side at which the fuel nozzle is arranged, in particular not via the fuel nozzle arranged on the input side. The fuel nozzle is designed for low complexity, e.g. not for operation with gaseous fuel.

Here preferably, the axial position of the gas supply openings is configured such that during operation, the gaseous fuel is supplied into or downstream of a first combustion zone with (at least partial) combustion of the liquid fuel.

The gaseous fuel is in particular hydrogen or a hydrogen-containing combustion gas, and/or another combustion gas, e.g. methane or a methane-containing combustion gas.

The liquid fuel is in particular a kerosene-based or kerosene-related fuel (e.g. Jet-A1, diesel or a synthetic substitute fuel (SAF=sustainable aviation fuel)).

The peripheral wall may e.g. be a single and/or a double wall, in particular with a gap formed in-between. The gas supply openings are in particular arranged upstream of the outlet.

The introduction of the gaseous fuel downstream of the fuel nozzle allows the use of an input-side fuel nozzle which is designed solely for operation with liquid fuel. In this way, the complexity of the fuel nozzle and combustion chamber assembly can be kept comparatively low even when designed for operation with additional gaseous fuel. Also, there may be advantages in operation, wherein in relevant operating regions, combustion in the first combustion zone is optimised with respect to the liquid fuel.

A comparatively safe introduction of gaseous fuel into the combustion space can be achieved if the combustion chamber assembly comprises at least one, preferably a plurality of mixing opening(s) arranged downstream of the fuel nozzle(s) in the peripheral wall for the supply of mixing air to the combustion space, and if the gas supply opening(s) is/are each (where a plurality of openings are provided) present on a gas nozzle arranged (radially) inside the mixing opening(s) (i.e. surrounded by the flow cross-section of the mixing opening), wherein in each case at least one (preferably precisely one) gas nozzle with a mixing opening forms an air/gas supply assembly. A gas supply opening is in each case arranged on the downstream end of the one gas nozzle. The gas supply openings may have any flow cross-sectional shape, for example circular, elliptical, slotted or polygonal. Preferably, the shape of the flow cross-section corresponds (in some cases is congruent) to the shape of the flow cross-section of the mixing opening with which the respective air/gas supply assembly is formed. The gas nozzles may have a constant flow cross-section, in particular in a downstream portion. The gas nozzles may be attached to the peripheral wall inside the mixing opening by one or more fixing means (e.g. webs).

The mixing openings may have any shape of flow cross-section, for example circular, elliptical, slotted and/or polygonal.

The mixing openings may each be formed as openings in the peripheral wall, wherein their lengths correspond to the thickness of the peripheral wall, and/or protrude beyond the peripheral wall (into the combustion space and/or into an air gap surrounding the combustion chamber), wherein they are formed in the manner of air ducts. At least one outlet is arranged on the downstream end of each mixing opening. In particular, an inlet region and the outlet region of the mixing openings (and/or the gas supply openings) may be formed aerodynamically, e.g. rounded to minimise backflow zones.

The mixing openings are in particular arranged equidistantly from one another in the circumferential direction, wherein the number of mixing openings corresponds for example to the number of input-side fuel nozzles.

Because of such an arrangement of the gas supply openings or gas nozzles, the gaseous fuel is injected with the mixing air, i.e. into a flow with comparatively high speed. Thus the combustion process of the gaseous fuel may be shifted into the combustion space to a varying extent depending on design (e.g. size of flow cross-section), wherein the mixing air may serve e.g. as combustion air and/or as casing air or similar. In this way, the thermal load on the peripheral wall and/or the gas supply nozzle(s) may be advantageously reduced.

In this context, it is particularly advantageous if the gas nozzle(s) is/are each arranged centrally inside the respective mixing opening (forming the respective air/gas supply assembly). In this way, the gaseous fuel is advantageously introduced into a region of comparatively high flow speeds so that the reaction zone can be shifted away from the gas supply opening. The arrangement of the gas nozzle relative to the mixing opening may in particular be coaxial, wherein the central longitudinal axes are congruent to one another. The central longitudinal axes may here be oriented perpendicularly to the peripheral wall (at an angle of 90°) or obliquely, wherein the angle to the peripheral wall is less than 90°.

A defined outflow of the gaseous fuel can be achieved advantageously if at least one air duct, running at least in portions (as a ring (gap)) around the gas nozzle(s), is arranged in the respective mixing opening (of the corresponding air/gas supply assembly) for forming an air flow running around the gas nozzle(s). The air duct preferably has a smaller flow cross-section than the mixing opening. The air duct may for example terminate flush with the gas supply opening or upstream thereof. For an advantageously symmetrical introduction of the gaseous fuel, the air duct is preferably arranged coaxially to the gas nozzle and/or the mixing opening and/or has a constant duct height (e.g. gap thickness).

For an even introduction of the mixing air and/or gaseous fuel, preferably several mixing openings are arranged in at least one opening row, wherein z mixing openings are present per opening row and are arranged at a uniform axial position and preferably equidistantly from one another in the circumferential direction of the peripheral wall. When several opening rows are provided, their mixing openings may be arranged offset to one another in the circumferential direction.

Here, for each opening row, an air/gas supply assembly may be formed in each or in every nth mixing opening, with n=2 to z, wherein n preferably forms the ordinate of an integral quotient of z. Thus an even distribution of gas nozzles per opening row can be obtained with an equidistant arrangement of the gas nozzles in the circumferential direction, which promotes a symmetrical combustion. The arrangement of gas nozzles may differ for each opening row.

Advantages for operation are obtained if several opening rows are provided which are offset in the axial direction of the combustion space (or combustion chamber), wherein at least one air/gas supply assembly is arranged at least in the furthest downstream opening row.

Advantageous design possibilities for optimised operation are achieved if the mixing opening(s) (with their outlets) are formed flush with the peripheral wall relative to the combustion space and/or are offset inwardly into the combustion space relative to the peripheral wall (the air ducts protrude into the combustion space). Combinations of flush and inwardly offset mixing openings are also possible.

Advantageous design possibilities for optimised operation are achieved if the gas supply opening(s) are formed flush with the peripheral wall relative to the combustion space and/or are offset inwardly into the combustion space relative to the peripheral wall and/or the respective mixing opening (with which they form the air/gas supply assembly). Combinations of flush and inwardly offset mixing openings are also possible.

Advantageous design possibilities for optimised operation are achieved if at least one mixing opening is present in an air/gas supply assembly and has a first flow cross-section A1, and at least one mixing opening is present without air/gas supply assembly and has a second flow cross-section A2, wherein the size of the first flow cross-section A1 corresponds to the size of the second flow cross-section A2. This is achieved for example with circular or annular flow cross-sections with a correspondingly greater outer diameter of the mixing opening inside the air/gas supply assembly.

Alternatively or additionally, the size of the first flow cross-section A1 may be greater than the size of the second flow cross-section A2. This is achieved for example with circular or annular flow cross-sections with a correspondingly significantly greater outer diameter of the mixing opening inside the air/gas supply assembly.

Alternatively or additionally, the contour of the first flow cross-section A1 may correspond to the contour of the second flow cross-section A2 (in size and/or shape). This gives a smaller first flow cross-section A1 compared with the second flow cross-section A2.

In the case of multiple air/gas supply assemblies, a combination of these design variants is also possible.

Advantageous flow conditions are achieved in particular if the gas supply opening has a diameter of around ½ to ⅙ of the diameter of the outlet of the mixing opening (or a corresponding ratio of flow cross-sections (after conversion to flow cross-sections) in the case of noncircular flow cross-sections).

The invention may advantageously be applied to an annular combustion chamber, wherein the combustion space is formed as a ring running around a central axis, wherein the peripheral wall has a radially inner wall and a radially outer wall.

Advantageous design possibilities for optimised operation are achieved if the gas supply opening(s), in particular the gas nozzle(s), is/are arranged on the radially inner wall and/or on the radially outer wall, in particular in each case as air/gas supply assemblies.

For advantageous operation, an axial distance of the gas supply opening(s) and/or the mixing opening(s) from the input-side fuel nozzle(s) may be between 0.2 and 1.5, preferably between 0.3 and 1.0 times a height H of the combustion space. For an annular combustion chamber, the height H corresponds to the radial distance between the inner sides of the outer and inner wall of the peripheral wall. For a cylindrical combustion chamber, H corresponds to the diameter of the combustion space. The axial distance is measured from the central axis of the respective gas supply opening or mixing opening to the end face and/or downstream end of the input-side fuel nozzle. When several opening rows are provided, the distance relates in particular to the furthest upstream opening row and/or to the second, further downstream opening row. Any opening rows arranged further downstream may for example be arranged at a distance of between 1 and 3 times an axial extent (with respect to the longitudinal axis) of the mixing opening(s) (e.g. a diameter) from the upstream opening row (with respect to the upstream edges of the mixing openings).

Advantageous possibilities for cooling the combustion chamber assembly arise if the peripheral wall is formed as a double wall with an inner wall on the combustion chamber side and an outer wall on the outside.

Advantageous possibilities for variation with respect to operation are achieved if a segmented gas distribution line is provided for supplying gas to the gas supply opening(s), wherein a separate fuel connection is assigned to each segment. Thus for example individual groups of gas nozzles can be controlled separately. The design of the distribution line may be optimised to the design of the combustion chamber assembly, and be arranged for example as a ring line in annular fashion in at least a substantially axial position of the gas nozzles, or upstream or downstream thereof.

In an advantageous variant of the method, combustion operation is set such that combustion of the liquid fuel supplied via the fuel nozzle(s) is held at least substantially in an operating state which is optimal with respect to the emission behaviour of the combustion chamber assembly, i.e. with an air-fuel ratio which guarantees a minimum emission of soot, carbon monoxide (CO), unburned hydrocarbons (UHC), nitrogen oxides (NOx) and carbon dioxide ($CO_2$). In addition, the supply of gaseous fuel is varied so as to set the total air-fuel ratio necessary for the respective operating state (from idle through start-up to cruise). In particular, the positioning of the gas supply nozzles arranged downstream of the fuel nozzles is advantageous here, since thus firstly the liquid fuel can be burned in a first combustion zone at least partly without the direct influence of the gaseous fuel.

Further advantageous design variants of the method are described accordingly in connection with the design variants relating to the combustion chamber assembly.

Figures 2A, 2B:
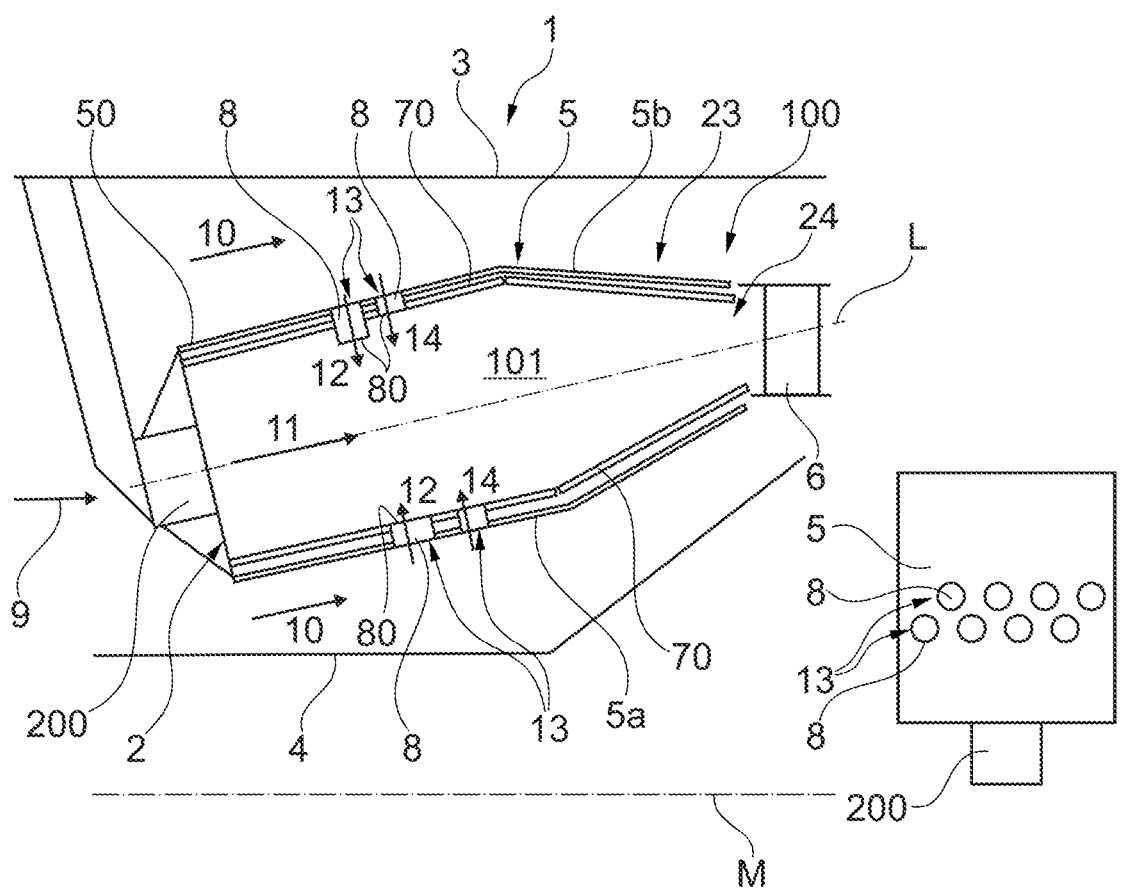
Figure 4:
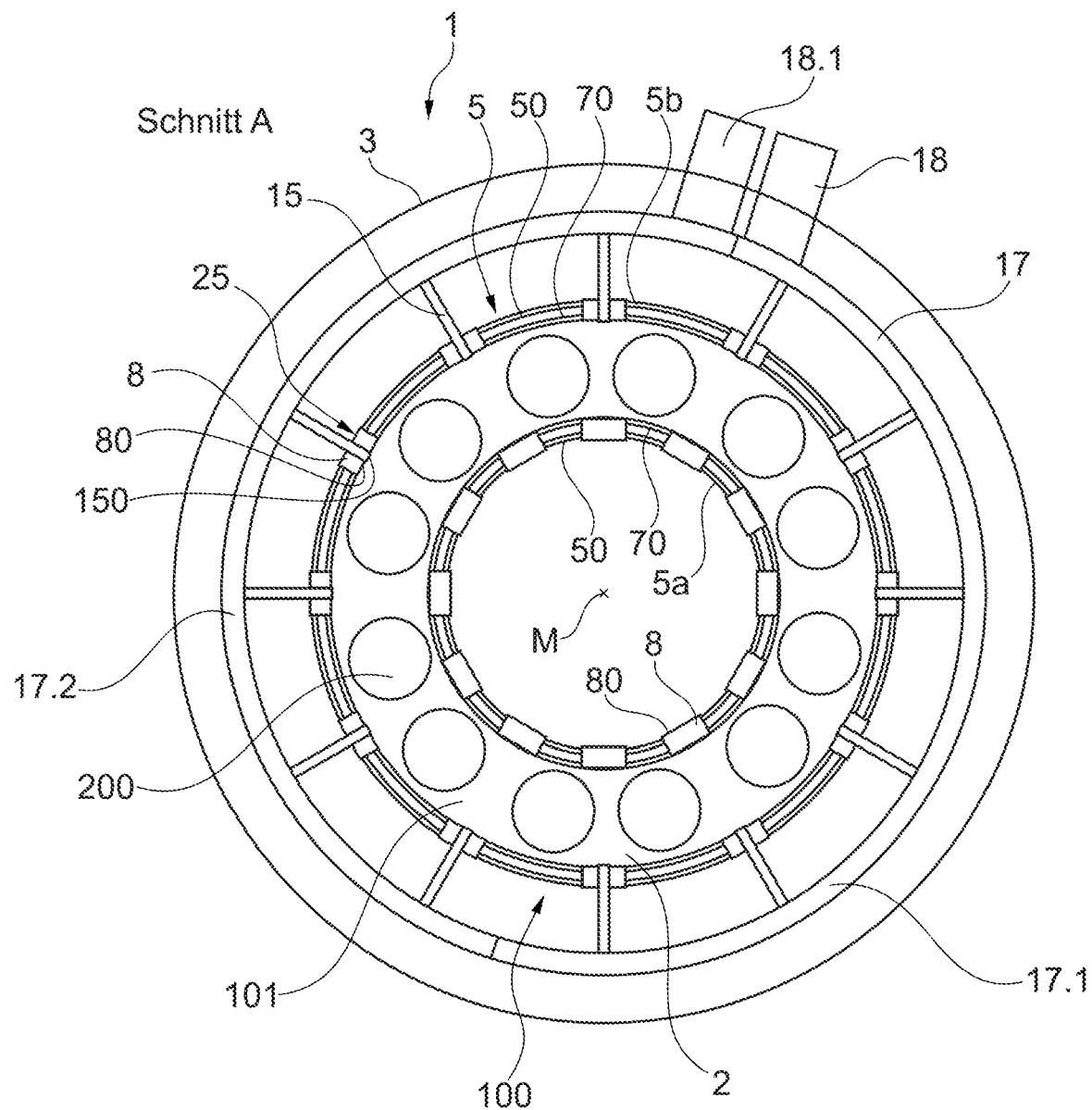
Figure 5:
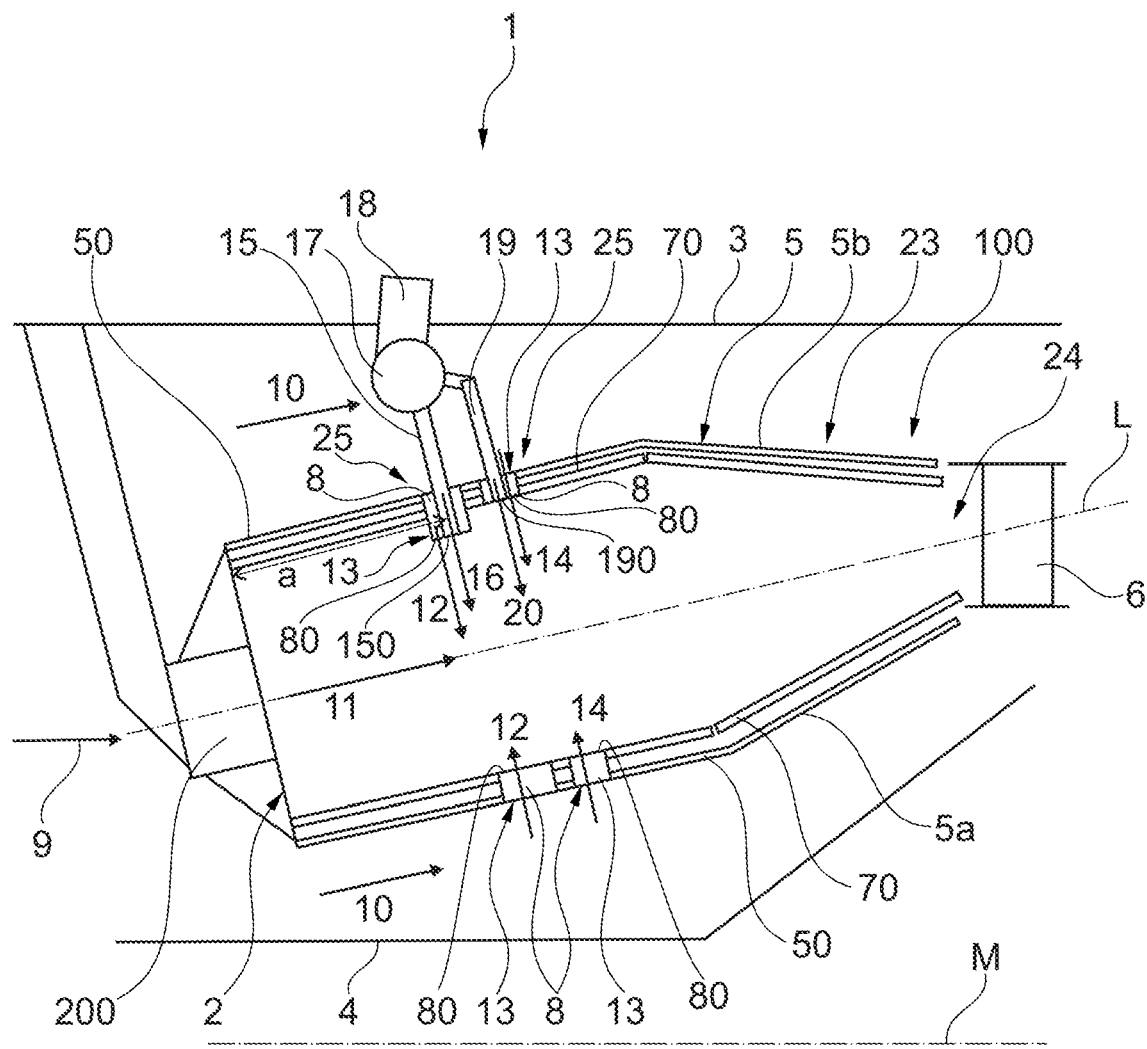
Figure 6A:
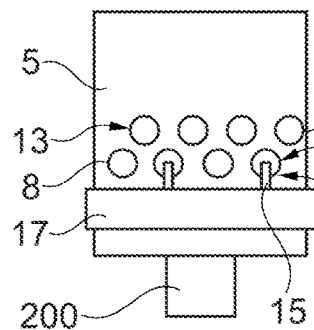
Figure 6B:
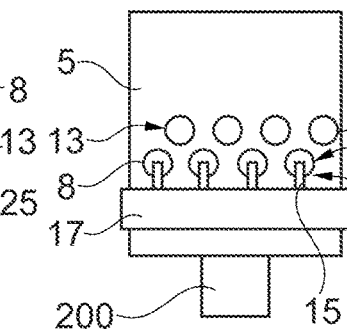
Figure 6C:
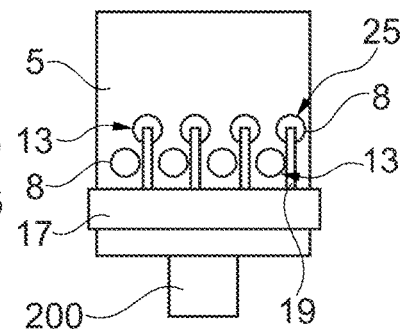
Figure 6D:
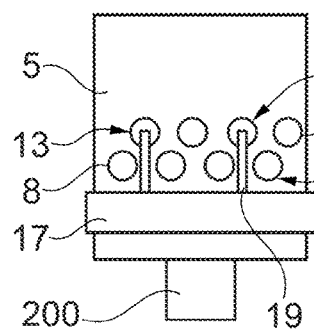
Figure 6E:
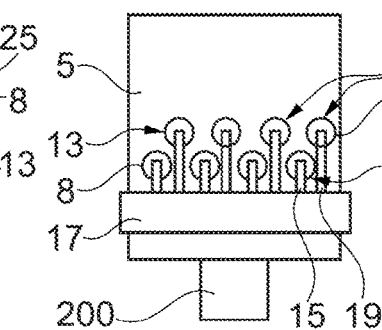
Figure 6F:
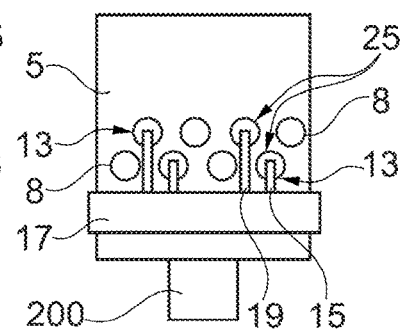
Figure 7A:
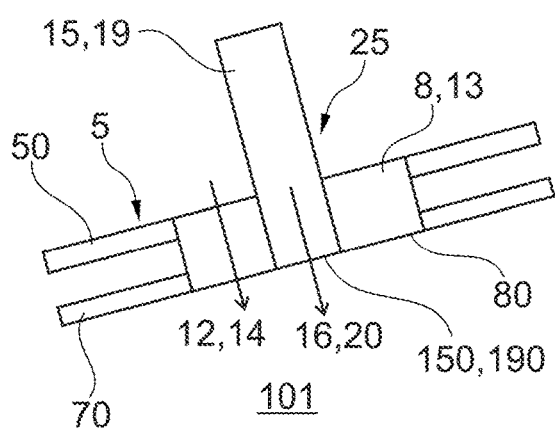
Figure 7B:
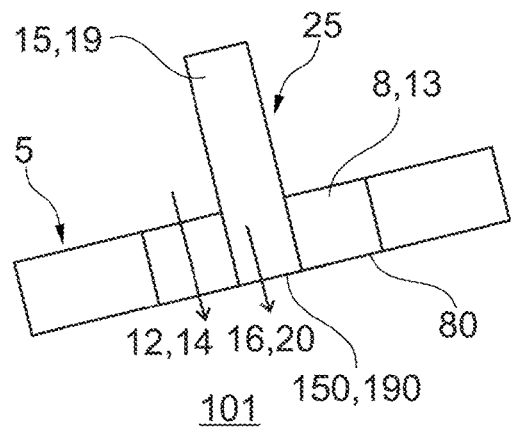
Figure 7C:
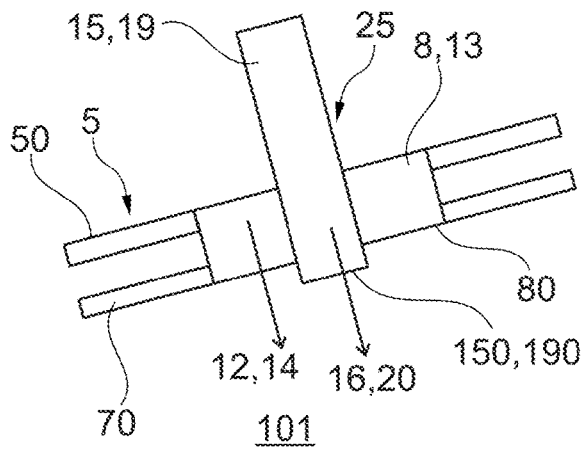
Figure 7D:
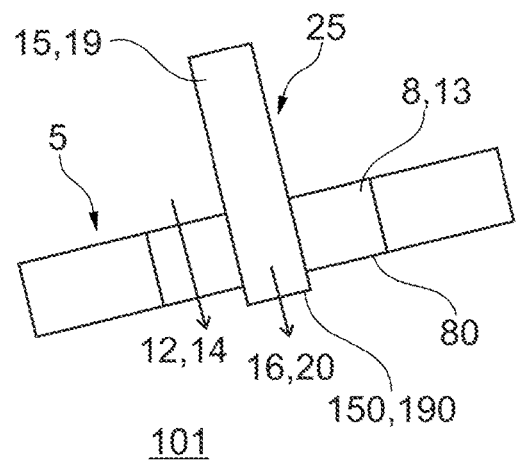
Figure 7E:
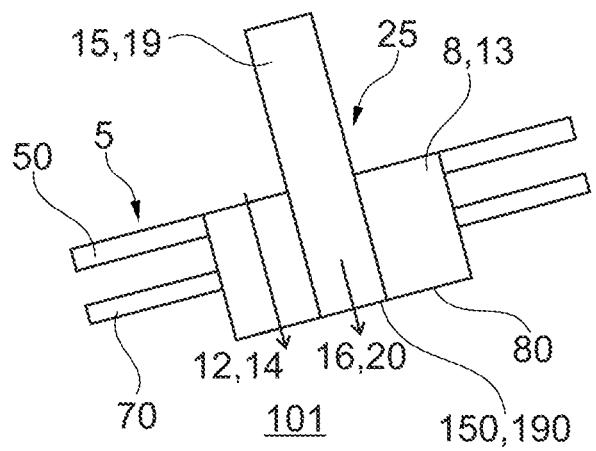
Figure 7F:
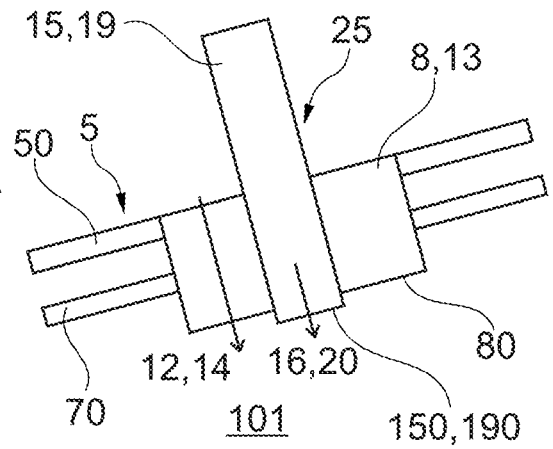
Figure 8A:
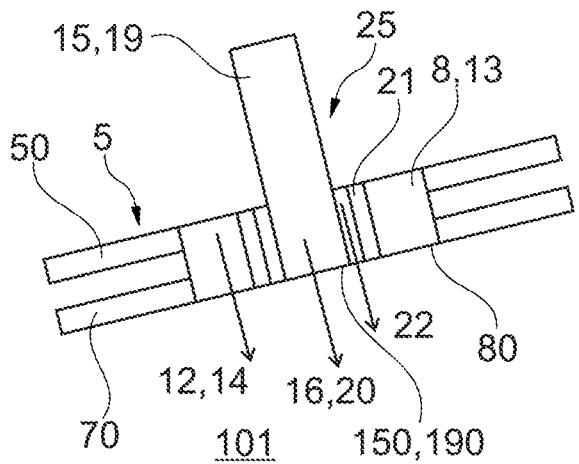
Figure 8B:
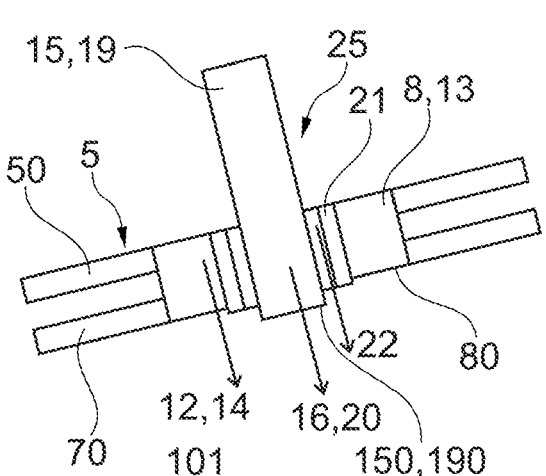
Figures 9A, 9B:
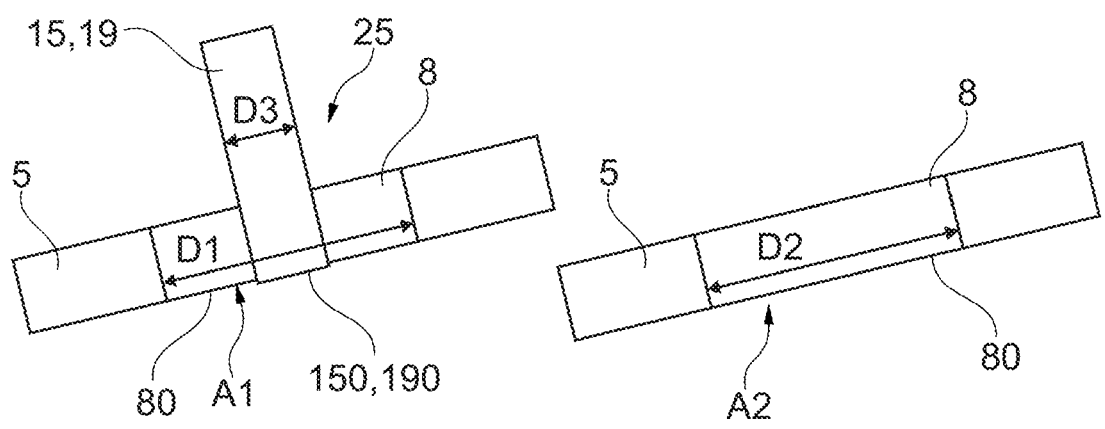
Figure 10:
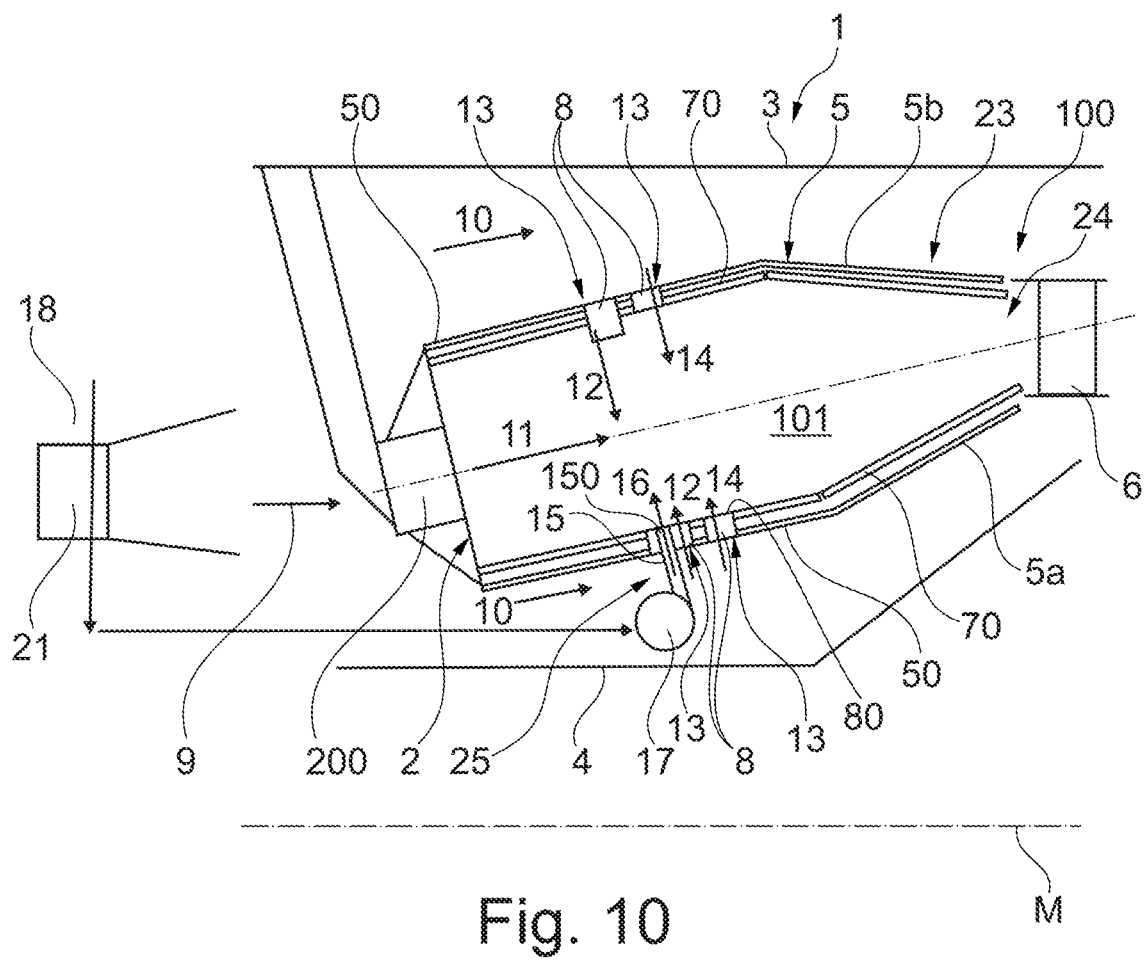

The invention will be explained in more detail hereunder by means of exemplary embodiments with reference to the drawings, in which:

FIGS. 1A, 1B show a combustion chamber assembly according to the prior art with an opening row, schematically in longitudinal section (FIG. 1A) and in plan view (FIG. 1B), FIGS. 2A, 2B show a combustion chamber assembly according to the prior art with two opening rows, schematically in longitudinal section (FIG. 2A) and in plan view (FIG. 2B), FIGS. 3A to 3C show a proposed combustion chamber assembly with an opening row comprising multiple gas nozzles in different arrangements, schematically in longitudinal section (FIG. 3A) and in plan view (FIG. 3B, FIG. 3C), FIG. 4 shows a sectional view of the combustion chamber assembly along section line A from FIG. 3A in schematic illustration, FIG. 5 shows a further exemplary embodiment of a combustion chamber assembly with multiple gas nozzles in two opening rows, schematically in longitudinal section, FIGS. 6A to 6F show combustion chamber assemblies with various exemplary embodiments of gas nozzle arrangements in two opening rows, in schematic plan view, FIGS. 7A to 7F show respectively various exemplary embodiments of air/gas supply assemblies, each with a mixing opening and a gas nozzle and parts of the peripheral wall, schematically in longitudinal section, FIGS. 8A, 8B show two different exemplary embodiments of air/gas supply assemblies and parts of the peripheral wall, each with an air duct, schematically in longitudinal section, FIGS. 9A, 9B show an air/gas supply assembly (FIG. 9A) and a mixing opening outside an air/gas supply assembly (FIG. 9B), schematically in longitudinal section, and FIG. 10 shows a further exemplary embodiment of a proposed combustion chamber assembly, with arrangement of gas nozzles on a radially inner wall, schematically in longitudinal section.

FIG. 1A shows, in a schematic longitudinal sectional illustration, a combustion chamber assembly 1 for use in an aircraft engine as known from the prior art. FIG. 1A shows, partially schematically, an inner casing 4 and an outer casing 3 of a combustion chamber of an aircraft engine.

The combustion chamber assembly 1 comprises a combustion chamber 100 configured as an annular combustion chamber, with a combustion space 101 running as a ring around a central axis M and oriented axially along a longitudinal axis L. The combustion space 101 is bordered by a peripheral wall 5 of the combustion chamber assembly 1 comprising a radially inner flame tube wall 5a and a radially outer flame tube wall 5b. The peripheral wall 5 is formed for example as a double wall with an inner wall 70 on the combustion chamber side and an outer wall 50 on the outside. The peripheral wall 5 has for example a constant height H along its axial course starting from an end face 2, wherein the radially inner flame tube wall 5a and the radially outer flame tube wall 5b run parallel to one another. Further downstream is a cross-sectional constriction 23 with flame tube walls 5a, 5b running radially towards one another, and opening at an outlet 24 of the combustion chamber assembly 1. A turbine leading impeller 6 of a turbine assembly (not shown here completely) adjoins the outlet 24 on the downstream side.

On the input side of the combustion space 101, multiple fuel nozzles 200 are arranged running all around on the inlet end face 2 of the combustion chamber 100, of which one fuel nozzle 200 is illustrated schematically in the longitudinal section shown in FIG. 1A. By means of the fuel nozzle 200, during operation, a mixture 11 of liquid fuel and air 9 is supplied to the combustion space 101.

The liquid fuel is in particular a kerosene-based or kerosene-related fuel (e.g. Jet-A1, diesel or a synthetic substitute fuel (SAF=sustainable aviation fuel)).

In the present case, for example several mixing openings 8 are arranged downstream of the end face 2 and/or the downstream end of the fuel nozzle 200, for supplying to the combustion space 101, during operation, mixing air 12 which is extracted from air 11 surrounding the combustion chamber assembly 1 during operation.

As FIG. 1B shows in a schematic plan view of the combustion chamber assembly 1, the mixing openings 8 are here arranged for example in a circumferential opening row 13. The mixing openings 8 of an opening row 13 lie at a uniform axial position and are arranged preferably equidistantly from one another in the circumferential direction running around the combustion chamber assembly 10.

As FIG. 1A shows, the mixing openings 8 are formed in the radially inner flame tube wall 5a and in the radially outer flame tube wall 5b. The mixing openings 8 in the radially inner flame tube wall 5a and the radially outer flame tube wall 5b are for example arranged at the same axial position relative to the longitudinal axis L. Each mixing opening 8 has an outlet 80 at the downstream end which may be formed flush with the peripheral wall 5 relative to the combustion space 101, as illustrated in the example shown in FIG. 1A with respect to the radially inner mixing openings 8. Alternatively, the mixing openings 8 comprising a collar may protrude into the combustion space 101 as an air duct, wherein the outlets 80 are offset radially inward into the combustion space 101.

In the double-wall design of the peripheral wall 5, the mixing opening 8 is configured as an air duct guided through the outer wall 50 and the inner wall 70, in order to counter an outflow of the mixing air 12 through the air gap between the outer wall 50 and the inner wall 70.

FIG. 2A and FIG. 2B show a combustion chamber assembly 1 according to the prior art in a double-row variant comprising two axially offset opening rows 13. Within the respective opening rows 13, the mixing openings 8 are arranged equidistantly from one another and at the same axial position. Relative to one another, the opening rows 13 are arranged offset to one another with an offset arrangement of the mixing openings 8 in the circumferential direction. During operation, mixing air 14 is supplied to the combustion space 101 through the opening row 13 arranged further downstream. The flow cross-sections of the mixing openings 8 and/or the radial positions of the outlets 80 may be different, for example may vary according to opening row 13.

FIGS. 3A, 3B and 3C show a refinement according to the invention of the combustion chamber assembly 1, wherein the combustion chamber assembly 1 is configured for operation with gaseous fuel. The gaseous fuel may be supplied to the combustion chamber 101 in particular simultaneously with or also alternatively to the liquid fuel.

With a view to reduced complexity, the fuel nozzles 200 are not designed for example for operation with a gaseous fuel.

The gaseous fuel (referred to below in brief as gas 16) is in particular hydrogen or a hydrogen-containing combustion gas, and/or another combustion gas, e.g. methane or a methane-containing combustion gas.

In the exemplary embodiment shown in FIGS. 3A, 3B and 3C, preferably a plurality of gas nozzles 15 are present which are arranged in the peripheral wall 5 in the opening row 13 downstream of the fuel nozzle 200. A gas nozzle 15 is shown in the schematic longitudinal section of the fuel chamber assembly 1 shown in FIG. 3A.

Gas supply openings 150 are present at the downstream ends of each gas nozzle 15.

In the exemplary embodiment shown in FIGS. 3A, 3B and 3C, as an example one opening row 13 is provided.

As FIG. 3A shows more in more detail, the gas nozzles 15 are each arranged inside one of the mixing openings 8, wherein in each case a gas nozzle 15 with a mixing opening 8 forms an air/gas supply assembly 25. The gas nozzles 15 are here advantageously arranged centrally inside the respective mixing opening 8 for symmetrical injection, wherein the flow cross-section of the mixing opening 8 radially surrounds the gas supply opening 150. The gas nozzle 15 may be arranged perpendicularly to the peripheral wall 5 for supply of combustion gas at right angles to the main flow direction inside the combustion chamber 100. An arrangement at an oblique angle is also possible, so that an angle between the peripheral wall 5 and a central longitudinal axis of the gas nozzle 15 is less than 90°. The mixing openings 8 are preferably oriented at the same angle as the gas nozzles 15.

The central arrangement of the gas nozzles 15 in the mixing openings 8 introduces the gas 16 into an air flow at high speed during operation. Thus advantageously, the reaction zone of the gaseous fuel inside the combustion space 101 may be shifted further into the combustion space 101 from the gas nozzle 15 or peripheral wall 5. In this way, the thermal load on the gas nozzle 15 and/or peripheral wall 5 is reduced.

As FIG. 3A shows, in the exemplary embodiment illustrated, the gas nozzles 15 protrude into the combustion space 101. The gas supply opening 150 is for example formed flush with the downstream end of the mixing opening 8.

The flow cross-section of the gas nozzles 15 may be circular and/or have a different shape, e.g. polygonal, elliptical or similar.

FIG. 3B shows, in a schematic plan view onto the combustion chamber assembly 1, an exemplary embodiment in which a gas nozzle 15 is assigned to each of the mixing openings 8 to form a respective air/gas supply assembly 25.

FIG. 3C shows, in a schematic plan view onto the combustion chamber assembly 1, an exemplary embodiment in which a gas nozzle 15 is assigned to every second mixing opening 8 to form a respective air/gas supply assembly 25. Mixing air 12 without the addition of gas 16 is supplied via the respective other mixing openings 8.

As FIG. 3A shows, an axial distance a (relative to the respective central axis) of the gas nozzles 15 and/or mixing openings 8 from the input-side fuel nozzle 200 and/or the end face 2 is for example between 0.65 and 0.85 times the height H of the combustion space 101. With such spacing, during operation, upstream of the gas supply, a (partial) combustion reaction of the liquid fuel may take place inside the combustion space 101, wherein the fuel nozzle 200 is advantageously optimised for the combustion of liquid fuel.

At the same time, the gaseous fuel is supplied sufficiently far upstream to allow a complete reaction of the gaseous fuel in the combustion space 101 with a length typical of an aircraft engine.

The gas nozzles 15 are in particular supplied with gaseous fuel via a distribution line configured as a ring line 17 which is supplied with fuel by means of a fuel connection 18. As shown in FIGS. 3A, 3B and 3C, the ring line 17 may be arranged axially at least close to the gas nozzles 15. A different design and/or arrangement of the distribution line would also be possible, for example further upstream or downstream of the gas nozzles 15.

Advantageously, a supply may also take place by means of a segmented distribution line, as illustrated schematically for example in the sectional illustration along section line A in FIG. 4. Here, two fuel connections 18, 18.1 are provided, each of which supplies fuel to a segment 17.1, 17.2 of the ring line 17. A fuel connection 18, 18.1 is assigned to each segment 17.1, 17.2 of the distribution line, in particular the ring line 17. This allows separate control or regulation of individual groups of gas nozzles 15 arranged on the respective segment 17.1, 17.2 of the distribution line.

FIG. 4 shows the annular design of the combustion chamber assembly 1. As an example, 12 air/gas supply assemblies 25 are present, formed for example at the radially outer mixing openings 8. Furthermore, 12 fuel nozzles 200 and 12 mixing openings 8 without assigned gas nozzle 15 are present, in this case arranged for example on the radial inside of the combustion chamber 100.

FIG. 5 shows a design variant with two opening rows 13. The upstream opening row 13 is spaced from the fuel nozzle 200 by an axial distance a of around 0.65 to 0.85 times the height H of the combustion space (FIG. 3A). The further downstream opening row 13 is axially spaced by e.g. between 1 and 3 times the diameter of the mixing opening 8 (relative to the upstream edge). Gas 20 is supplied to the combustion chamber through gas nozzles 19 in the second, further downstream opening row 13. The gas nozzles 15 and the gas nozzles 19 are connected for example to the ring line 17.

As FIG. 5 shows, the gas nozzles 15 and the gas nozzles 19 protrude to different extents into the combustion space 101. For example, the air/gas supply assembly 25 of the opening row 13 arranged upstream relative to the combustion chamber 100 protrudes into the combustion space 101, while the downstream opening row 13 is configured flush with the peripheral wall 5. In the example shown, the downstream ends of the mixing openings 8 and the gas supply openings 150, 190 are formed flush with one another.

FIGS. 6A to 6F show exemplary arrangements of the gas nozzles 15, 19 relative to the mixing openings 8 in the embodiment variant with two opening rows 13. For each opening row 13, as already shown in FIGS. 3B and 3C, these may be present in each or every nth mixing opening 8 (with n equal to 2 up to "number of mixing openings"), for example in every first or second one. When several opening rows 13 are present, preferably air/gas supply assemblies 25 are present at least in the furthest downstream opening row 13.

FIG. 6A shows an embodiment variant in which the air/gas supply assemblies 25 are arranged in every second mixing opening 8 in the further upstream opening row 13.

FIG. 6B shows an embodiment variant in which the air/gas supply assemblies 25 are arranged in every mixing opening 8 in the further upstream opening row 13.

FIG. 6C shows an embodiment variant in which the air/gas supply assemblies 25 are arranged in every mixing opening 8 in the further downstream opening row 13.

FIG. 6D shows an embodiment variant in which the air/gas supply assemblies 25 are arranged in every second mixing opening 8 in the further downstream opening row 13.

FIG. 6E shows an embodiment variant in which the air/gas supply assemblies 25 are arranged in every mixing opening 8 in both opening rows 13.

FIG. 6F shows an embodiment variant in which the air/gas supply assemblies 25 are arranged in every second mixing opening 8 in both opening rows 13.

FIGS. 7A to 7F show exemplary arrangements of the mixing openings 8 and/or gas supply openings 150, 190 in their radial positioning relative to the peripheral wall 5. In the exemplary embodiments in FIGS. 7A, 7C, 7E and 7F, the peripheral wall 5 is formed for example as a double wall, with the inner wall 70 and the outer wall 50. In the exemplary embodiments in FIGS. 7B and 7D, the peripheral wall 5 is formed for example as a single wall.

In FIGS. 7A and 7B, both the respective outlet 80 of the mixing opening 8 and the respective gas supply opening 150, 190 are formed flush with the peripheral wall 5 and accordingly also flush with one another.

In FIGS. 7C and 7D, the respective outlet 80 of the mixing opening 8 is formed flush with the peripheral wall 5, while the gas supply opening 150, 190 is offset inwardly into the combustion space 101, i.e. protrudes into the combustion space 101.

In FIGS. 7E and 7F, each outlet 80 is offset radially inwardly into the combustion space 101, since the supply openings 8 are each formed by means of a collar as an air duct. In the exemplary embodiment shown in FIG. 7E, the gas supply opening 150, 190 is formed flush with the mixing opening 8 and hence also offset inwardly into the combustion space 101. In the exemplary embodiment shown in FIG. 7F, the gas supply opening 150, 190 is offset further into the combustion space 101 than the outlet 80 of the mixing opening 8.

Because of the different radial arrangements of the mixing openings 8 (with air outlets 80) and/or the gas supply opening 150, 190, different effects can be achieved with respect to mixing in particular with the mixing air 12, 14 and/or the main flow inside the combustion space 101. Depending on combustion chamber design and/or operating conditions, the one or the other design variant or combinations thereof may be advantageous. An advantageous design variant may be determined for example in test bench operation.

FIGS. 8A and 8B each show a design variant of an air/gas supply arrangement 25, wherein an air duct 21, running at least in portions radially around the gas nozzles 15.19, is arranged in the mixing opening 8 in order to form an air flow 22 running around the gas nozzles 15, 19. The air duct 21 is in particular arranged coaxially to the respective gas nozzle 15, 19 and/or the mixing opening 8. The air duct 21 contributes to defined flow conditions of the air flow around the gas flow to be provided via the gas nozzle 15, 19, which air flow may for example serve as a type of casing air.

In the exemplary embodiment of FIG. 8A, the air duct 21 is formed flush with the outlet 80 of the mixing opening 8 and the gas supply opening 150, 190. In the exemplary embodiment of FIG. 8B, the air duct 21 is offset inwardly into the combustion space 101 relative to the mixing opening 8, while the gas nozzle 15, 19 is offset even further inwardly into the combustion space 101 relative to the air duct 21. A single-walled design of the peripheral wall 5 is also possible.

FIGS. 9A and 9B show exemplary conditions of the flow cross-section of the gas nozzles 15, 19 or the gas supply opening 150, 190 and the mixing openings 8. In the present case, the flow cross-sections are formed example circular: for the gas supply opening 150, 190, with a diameter D3; for the first mixing opening 8 inside the air/gas supply assembly 25 (see FIG. 9A), in annular form with an (outer) diameter D1 (flow cross-section with area $A1 \approx 0.25*Pi*(D1^2-D3^2)$); and for a second mixing opening 8 outside an air/gas supply assembly 25, circular with a diameter D2 (flow cross-section with area $A2=0.25*Pi*D2^2$).

Here, within the air/gas supply assembly 25, the diameter D3 of the gas supply opening 150, 190 may amount for example to ½ to ⅙ of the diameter D1 of the mixing opening 8. For example, the diameter D1 of the mixing opening 8 may be 10 mm, and the diameter D3 of the gas nozzle 15 may be 19.3 mm. Preferably, the flow cross-sections are designed such that over the entire operating range, taking into account a pressure fall over the combustion chamber selected during design, the speed of the inflowing combustion gas is higher than the speed of the inflowing mixing air, which e.g. is between 60 m/s and 140 m/s.

In the exemplary embodiment shown in FIGS. 9A and 9B, the contour of the first flow cross-section of the first mixing opening 8 corresponds to the contour of the second mixing opening 8, wherein because of the circular (annular) form, the diameter D1 is equal to diameter D2. The result is a smaller area of the first flow cross-section A1 compared with the second flow cross-section A2.

It is also possible to select the diameter D1 larger, namely such that the size of the first flow cross-section A1 corresponds to the size of the second flow cross-section A2. It is also possible to design the first flow cross-section larger than the second flow cross-section, wherein in the present case for example the first diameter D1 would have to be selected very much larger than the second diameter D2.

FIG. 10 shows a design variant in which the gas supply opening 150, in particular the gas nozzle 15, is arranged on the radially inner flame tube wall 5a with respect to the central axis M, for example in the upstream opening row 13. For this, the gas 16 may be brought from radially outside to the inside by a suitable component, e.g. webs or trailing blades in a pre-diffusor.

During operation, the liquid fuel is introduced into the combustion space 101 via the fuel nozzle 200. Alternatively or additionally, the gaseous fuel is introduced into the combustion space 101 via the gas nozzles 15 and where applicable the gas nozzles 19.

In an advantageous operating variant, the fuel nozzle 200 is held in an optimal operating state with respect to emissions at least for a majority of the operating time, i.e. with an air-fuel ratio which guarantees a minimal emission of soot, carbon monoxide, unburned hydrocarbons, nitrogen oxides and/or carbon dioxide. The gaseous fuel is then varied so as to set the total air-fuel ratio necessary for the respective operating state, in particular from idle through start-up to cruise.

Because of the proposed combustion chamber assembly 1, advantageously with comparatively little complexity, a high operating flexibility can be achieved with sole operation by liquid or gaseous fuel or in a combination of both fuels.

LIST OF REFERENCE SIGNS

1 Combustion chamber assembly
100 Combustion chamber

101 Combustion space
2 End face
200 Fuel nozzle
3 Outer casing
4 Inner casing
5 Peripheral wall
5a Inner flame tube wall
5b Outer flame tube wall
50 Outer wall
6 Turbine leading impeller
70 Inner wall
8 Mixing opening
80 Outlet
9 Air
10 Air around combustion chamber
11 Mixture
12 Mixing air
13 Opening row
14 Mixing air
15 Gas nozzle
150 Gas supply opening
16 Gas
17 Ring line
17.1 Segment
17.2 Segment
18 Fuel connection
18.1 Fuel connection
19 Gas nozzle
190 Gas supply opening
20 Gas
21 Air duct
22 Air flow
23 Cross-sectional constriction
24 Outlet
25 Air/gas supply assembly
A1 First flow cross-section
A2 Second flow cross-section
D1 Diameter
D2 Diameter
D3 Diameter
M Central axis
L Longitudinal axis
H Height
a Spacing

The invention claimed is:

1. A combustion chamber assembly, for use in an aircraft engine, comprising:
a peripheral wall which borders a combustion space oriented along a longitudinal axis, and
at least one fuel nozzle arranged on an input side of the combustion space for supply of liquid fuel to the combustion space,
wherein the combustion chamber assembly is configured for operation with the liquid and/or a gaseous fuel, and includes
a plurality of mixing openings arranged downstream of the at least one fuel nozzle in the peripheral wall for supply of mixing air to the combustion space,
wherein the mixing openings are arranged in at least one opening row, wherein z mixing openings are present per each of the at least one opening row and are arranged at a uniform axial position and equidistantly from one another in a circumferential direction of the peripheral wall,
a plurality of gas nozzles, each having a gas supply opening, by which the gaseous fuel is introduced into the combustion space, each of the gas supply openings arranged in a respective one of the mixing openings to form an air/gas supply assembly,
wherein for at least one of the at least one opening row, one of the air/gas supply assemblies is formed in every nth mixing opening, with n=2 to z.

2. The combustion chamber assembly according to claim 1, wherein the gas nozzles are each arranged centrally inside the respective mixing opening.

3. The combustion chamber assembly according to claim 1, wherein the at least one opening row includes a plurality of opening rows which are offset in an axial direction of the combustion space, wherein least one air/gas supply assemblies is arranged at least in a first downstream one of the opening rows.

4. The combustion chamber assembly according to claim 1, wherein the mixing openings are formed flush with the peripheral wall relative to the combustion space and/or are offset inwardly into the combustion space relative to the peripheral wall.

5. The combustion chamber assembly according to claim 1, wherein the gas supply opening are formed flush with the peripheral wall relative to the combustion space and/or are offset inwardly into the combustion space relative to the peripheral wall and/or the respective one of the mixing openings.

6. The combustion chamber assembly according to claim 1, wherein each of the mixing openings in the air/gas supply assemblies has a first flow cross-section, and at least one of the mixing opening not part of the one of the air/gas assemblies has a second flow cross-section, wherein
a size of the first flow cross-section corresponds to a size of the second flow cross-section.

7. The combustion chamber assembly according to claim 1, wherein the combustion space is formed as a ring running around a central axis, wherein the peripheral wall has a radial inner flame tube wall and a radially outer flame tube wall.

8. The combustion chamber assembly according to claim 7, wherein the gas nozzles are arranged on the radially inner flame tube wall and/or on the radially outer flame tube wall.

9. The combustion chamber assembly according to claim 1, wherein an axial distance a of the gas supply openings and/or the mixing openings from the at least one fuel nozzle is between 0.2 and 1.5 times a height of the combustion space.

10. The combustion chamber assembly according to claim 9, wherein the axial distance of the gas supply openings and/or the mixing openings from the at least one fuel nozzle is between 0.3 and 1.0 times the height of the combustion space.

11. The combustion chamber assembly according to claim 1, wherein the peripheral wall is formed as a double wall with an inner wall on a side of the combustion space and an outer wall.

12. The combustion chamber assembly according claim 1, and further comprising a segmented gas distribution line for supplying the gaseous fuel to the gas supply openings, wherein a separate fuel connection is assigned to each segment.

13. A gas turbine assembly having a turbine assembly and the combustion chamber assembly according to claim 1.

14. The combustion chamber assembly according to claim 1, wherein the each of the mixing openings in the air/gas supply assemblies has a first flow cross-section, and at least one of the mixing opening not part of the one of the air/gas assemblies has a second flow cross-section, wherein a size of the first flow cross-section is greater than a size of the second flow cross-section.

15. The combustion chamber assembly according to claim 1, wherein each of the mixing openings in the air/gas supply assemblies has a first flow cross-section, and at least one of the mixing opening not part of the one of the air/gas assemblies has a second flow cross-section, wherein a contour of the first flow cross-section corresponds to a contour of the second flow cross-section.

16. The combustion chamber assembly according to claim 1, wherein n forms an ordinate of an integral quotient of z.

17. A method for operating a combustion chamber assembly comprising:
   providing the combustion chamber assembly, for use in an aircraft engine, comprising:
      a peripheral wall which borders a combustion space oriented along a longitudinal axis, and
      at least one fuel nozzle arranged on an input side of the combustion space for supply of liquid fuel to the combustion space,
   wherein the combustion chamber assembly is configured for operation with the with liquid and/or a gaseous fuel, and includes:
      a plurality of mixing openings arranged downstream of the at least one fuel nozzle in the peripheral wall for supply of mixing air to the combustion space,
      wherein the mixing openings are arranged in at least one opening row, wherein z mixing openings are present per each of the at least one opening row and are arranged at a uniform axial position and equidistantly from one another in a circumferential direction of the peripheral wall,
      a plurality of gas nozzles, each having a gas supply opening, by which the gaseous fuel is introduced into the combustion space, each of the gas supply openings arranged in a respective one of the mixing openings to form an air/gas supply assembly,
      wherein for at least one of the at least one opening row, one of the air/gas supply
   assemblies is formed in every nth mixing opening, with n=2 to z,
   supplying the liquid fuel to the combustion space via the at least one fuel nozzle, and
   additionally, or alternatively to the liquid fuel, supplying the gaseous fuel to the combustion space via the gas supply openings.

18. The method according to claim 17, wherein n forms an ordinate of an integral quotient of z.

* * * * *